US010659266B2

(12) United States Patent
Park et al.

(10) Patent No.: US 10,659,266 B2
(45) Date of Patent: May 19, 2020

(54) TRANSMITTER AND SUBFRAME ARRANGEMENT METHOD THEREFOR

(71) Applicant: SAMSUNG ELECTRONICS CO., LTD., Suwon-si (KR)

(72) Inventors: Jung-hyun Park, Hwaseong-si (KR); Nam-hyun Kim, Suwon-si (KR); Sung-woo Park, Suwon-si (KR); Jung-pil Yu, Seongnam-si (KR); Sung-kyu Jung, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 108 days.

(21) Appl. No.: 16/073,937

(22) PCT Filed: Mar. 8, 2017

(86) PCT No.: PCT/KR2017/002516
§ 371 (c)(1),
(2) Date: Jul. 30, 2018

(87) PCT Pub. No.: WO2017/155304
PCT Pub. Date: Sep. 14, 2017

(65) Prior Publication Data
US 2019/0044776 A1 Feb. 7, 2019

Related U.S. Application Data

(60) Provisional application No. 62/305,157, filed on Mar. 8, 2016.

(30) Foreign Application Priority Data

Feb. 28, 2017 (KR) .................. 10-2017-0026623

(51) Int. Cl.
*H04L 27/26* (2006.01)
*H04L 5/00* (2006.01)
(Continued)

(52) U.S. Cl.
CPC ........ *H04L 27/2613* (2013.01); *H04L 5/0007* (2013.01); *H04L 5/0048* (2013.01);
(Continued)

(58) Field of Classification Search
CPC ............. H04L 27/2613; H04L 27/2602; H04L 27/2605; H04L 27/2636; H04L 5/0007;
(Continued)

(56) References Cited

U.S. PATENT DOCUMENTS 5,187,711 A  2/1993  Hodohara
9,253,006 B2  2/2016  Baek et al.
(Continued)

FOREIGN PATENT DOCUMENTS

JP          5872635 B2      3/2016
KR    10-2011-0039154 A    4/2011
(Continued)

OTHER PUBLICATIONS

Written Opinion (PCT/ISA/237) issued by the International Searching Authority in corresponding International Application No. PCT/KR2017/002516, dated May 22, 2017.
(Continued)

*Primary Examiner* — Curtis A Alia
(74) *Attorney, Agent, or Firm* — Sughrue Mion, PLLC

(57) ABSTRACT

Disclosed is a transmitter. The present transmitter comprises: a frame generation unit for generating a frame including a plurality of subframes, each of which includes data and a pilot; and a transmission unit for transmitting a frame to a receiver, wherein, when the plurality of subframes have the same FFT size, the frame generation unit determines an arrangement order of the plurality of subframes on the basis of the number of subcarriers used for transmission of the data and the pilot, and arranges the plurality of subframes according to the determined arrangement order.

15 Claims, 10 Drawing Sheets

(51) Int. Cl.
*H04W 72/04* (2009.01)
*H04L 25/02* (2006.01)

(52) U.S. Cl.
CPC ...... *H04L 25/0226* (2013.01); *H04L 27/2602* (2013.01); *H04L 27/2605* (2013.01); *H04L 27/2636* (2013.01); *H04W 72/0446* (2013.01); *H04W 72/0453* (2013.01); *H04L 5/0064* (2013.01)

(58) Field of Classification Search
CPC . H04L 5/0048; H04L 5/0064; H04L 25/0226; H04W 72/0453; H04W 72/0446
See application file for complete search history.

(56) References Cited

U.S. PATENT DOCUMENTS

| | | |
|---|---|---|
| 9,325,438 B2 | 4/2016 | Ko et al. |
| 2012/0195265 A1 | 8/2012 | Kim et al. |
| 2013/0235952 A1 | 9/2013 | Ko et al. |
| 2014/0376658 A1 | 12/2014 | Baek et al. |
| 2016/0056986 A1 | 2/2016 | Shin et al. |
| 2018/0019903 A1 | 1/2018 | Hwang et al. |
| 2018/0139021 A1* | 5/2018 | Atungsiri ............ H04L 5/0091 |

FOREIGN PATENT DOCUMENTS

| | | |
|---|---|---|
| KR | 10-2011-0121548 A | 11/2011 |
| KR | 10-2016-0026216 A | 3/2016 |
| WO | 2011/096762 A2 | 8/2011 |
| WO | 2012/067362 A2 | 5/2012 |
| WO | 2015/160083 A1 | 10/2015 |

OTHER PUBLICATIONS

International Search Report (PCT/ISA/210), issued by International Searching Authority in corresponding International Application No. PCT/KR2017/002516, dated May 22, 2017.
Sony "Subframe Order Proposal" Feb. 24, 2016, (16 pages total).

\* cited by examiner (a)

(b)

TRANSMITTER AND SUBFRAME ARRANGEMENT METHOD THEREFOR

TECHNICAL FIELD

The present disclosure relates to a transmitter and a method for arranging subframes thereof, and more particularly, to a transmitter for transmitting a frame in which a plurality of subframes are arranged to a receiver, and a method for arranging subframes thereof.

Recently, a broadcast and communication service becomes multi-function, wideband, and high quality. Particularly, in accordance with the development of electronic technologies, the spread of portable broadcast devices such as a high-definition digital TV, a high specification smart phone, and the like has been increased. As a result, the demand on various receiving methods and various service supports for broadcast services has been increased.

In accordance with the demand above, as an example, a broadcast communication standard such as Advanced Television System Committee (ATSC) 3.0 has been developed. Accordingly, it is requested to search for a method for processing signals more efficiently while using a method proposed in ATSC 3.0.

DISCLOSURE

Technical Problem

An object of the present disclosure is to provide a transmitter capable of arranging a plurality of subframes in a frame based on the number of subcarriers, and a method for arranging subframes thereof.

Technical Solution

According to an aspect of the present disclosure, a transmitter includes: a frame generation unit configured to generate a frame including a plurality of subframes that each include data and a pilot; and a transmission unit configured to transmit the frame to a receiver, wherein when FFT sizes of the plurality of subframes are the same as each other, the frame generation unit determines an arrangement order of the plurality of subframes based on the number of subcarriers used to transmit the data and the pilot, and arranges the plurality of subframes according to the determined arrangement order.

The frame generation unit may arrange the plurality of subframes in order of a subframe having the large number of subcarriers to a subframe having the small number of subcarriers.

The frame generation unit may determine the arrangement order of the plurality of subframes based on a value of Dx indicating an interval of scattered pilot on a frequency axis, and arrange the plurality of subframes according to the determined arrangement order.

The frame generation unit may arrange a first subframe having the smallest value of Dx among the plurality of subframes, and arrange a second subframe having a value of Dx of an integer multiple of the value of Dx of the first subframe after the first subframe.

The second subframe may be a subframe having the smallest value of Dx among one or more subframes having the value of Dx of the integer multiple of the value of Dx of the first subframe.

The frame generation unit may arrange a third subframe having a value of Dx of an integer multiple of the value of Dx of the second subframe among the plurality of subframes after the second subframe.

The third subframe may be a subframe having the smallest value of Dx among one or more subframes having the value of Dx of the integer multiple of the value of Dx of the second subframe.

The frame generation unit may arrange a fourth subframe having the smallest value of Dx among values of Dx which is not an integer multiple of the value of Dx of the first subframe after the second subframe.

When the subframe having the value of Dx of the integer multiple of the value of Dx of the first subframe does not exist in the plurality of subframes, the frame generation unit may arrange a fifth subframe having a small value of Dx next to the value of Dx of the first subframe after the first subframe.

The frame generation unit may arrange the plurality of subframes in order of a subframe having a small FFT size to a subframe having a large FFT size based on a FFT size of each of the plurality of subframes, the data may include audio data, a first image data, and additional data for generating second image data having image quality higher than that of first image data based on the first image data, the audio data may be included in at least one subframe having a first FFT size, the first image data may be included in at least one subframe having a second FFT size larger than the first FFT size, and the additional data may be included in at least one subframe having a third FFT size larger than the second FFT size.

According to another aspect of the present disclosure, a method for arranging subframes of a transmitter includes: generating a frame including a plurality of subframes that each include data and a pilot; and transmitting the frame to a receiver, wherein in the generating of the frame, when FFT sizes of the plurality of subframes are the same as each other, an arrangement order of the plurality of subframes is determined based on the number of subcarriers used to transmit the data and the pilot, and the plurality of subframes are arranged according to the determined arrangement order.

In the generating of the frame, the plurality of subframes may be arranged in order of a subframe having the large number of subcarriers to a subframe having the small number of subcarriers.

In the generating of the frame, the arrangement order of the plurality of subframes may be determined based on a value of Dx indicating an interval of scattered pilot on a frequency axis, and the plurality of subframes may be arranged according to the determined arrangement order.

In the generating of the frame, a first subframe having the smallest value of Dx among the plurality of subframes may be arranged, and a second subframe having a value of Dx of an integer multiple of the value of Dx of the first subframe may be arranged after the first subframe.

The second subframe may be a subframe having the smallest value of Dx among one or more subframes having the value of Dx of the integer multiple of the value of Dx of the first subframe.

In the generating of the frame, a third subframe having a value of Dx of an integer multiple of the value of Dx of the second subframe among the plurality of subframes may be arranged after the second subframe.

The third subframe may be a subframe having the smallest value of Dx among one or more subframes having the value of Dx of the integer multiple of the value of Dx of the second subframe.

In the generating of the frame, a fourth subframe having the smallest value of Dx among values of Dx which is not an integer multiple of the value of Dx of the first subframe may be arranged after the second subframe.

In the generating of the frame, when the subframe having the value of Dx of the integer multiple of the value of Dx of the first subframe does not exist in the plurality of subframes, a fifth subframe having a small value of Dx next to the value of Dx of the first subframe may be arranged after the first subframe.

In the generating of the frame, the plurality of subframes may be arranged in order of a subframe having a small FFT size to a subframe having a large FFT size based on a FFT size of each of the plurality of subframes, the data may include audio data, a first image data, and additional data for generating second image data having image quality higher than that of first image data based on the first image data, the audio data may be included in at least one subframe having a first FFT size, the first image data may be included in at least one subframe having a second FFT size larger than the first FFT size, and the additional data may be included in at least one subframe having a third FFT size larger than the second FFT size.

Advantageous Effects

According to the diverse exemplary embodiments of the present disclosure as described above, since the plurality of subframes are arranged in the frame based on the number of subcarriers, more accurate channel estimation may be performed in the receiver.

BEST MODE

Figure 1:
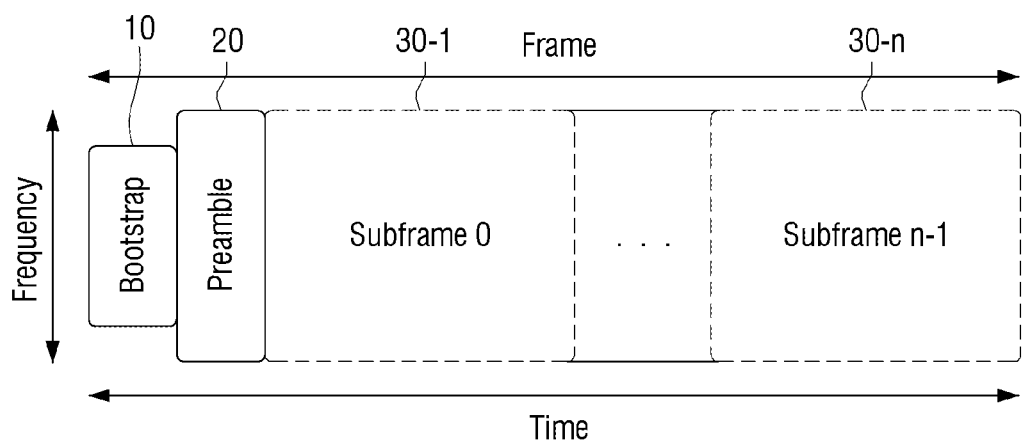
FIG. 1 is a diagram illustrating a frame structure defined in an ATSC 3.0 standard.

As the terms used in the present disclosure, general terms which are currently used as widely possible as are selected while considering functions in the present disclosure, but may be varied depending on an intention of those skilled in the art, a practice, an emergence of new technologies, and the like. In addition, in a certain case, there are terms which are arbitrarily selected by an applicant, and in this case, a meaning thereof will be described in detail in a description part of the disclosure corresponding to the terms. Therefore, the terms used in the present disclosure should be defined based on the meanings of the terms and the contents throughout the present disclosure, not simple names of the terms.

Throughout the present specification, unless explicitly described to the contrary, "comprising" any components will be understood to imply the inclusion of other components rather than the exclusion of any other components. A term "unit", "module", or the like, described in the specification means a unit of processing at least one function or operation and may be implemented by hardware or software, or may be implemented by a combination of hardware and software.

Hereinafter, exemplary embodiments of the present disclosure will be described in detail with reference to the accompanying drawings so that those skilled in the art may easily practice the present disclosure. However, the present disclosure may be implemented in various different forms and is not limited to the exemplary embodiments provided in the present description. In the accompanying drawings, portions unrelated to the description will be omitted in order to obviously describe the present disclosure, and similar reference numerals will be used to describe similar portions throughout the present specification.

A transmitter 100 (FIG. 2) according to an exemplary embodiment of the present disclosure may process a broadcast service according to a method defined in an Advanced Television System Committee (ATSC) 3.0 standard and transmit it to a receiver.

Hereinafter, a method for processing a broadcast service in the ATSC 3.0 standard will be briefly described.

A link layer receives a packet including broadcast data and a signaling therefore, processes the received packet to generate an ATSC 3.0 link layer protocol (ALP) packet, and transmits the ALP packet to a physical layer. In this case, the received packet may be a TS packet or an IP packet.

The physical layer receives the ALP packet, processes the ALP packet to generate a physical layer frame (hereinafter, referred to as a frame), and convert the frame into a broadcast signal to transmit the converted broadcast signal.

Here, the physical layer may include at leas one physical layer pipe (PLP). Here, PLP refers to a logical channel in the physical layer that transmits service data or related metadata capable of transmitting one or a plurality of services or service components. In this case, specific coding parameter and modulation may be applied to each PLP.

Meanwhile, the physical layer processes the broadcast service through an input formatting module, a bit interleaved coding and modulation (BICM) module, a framing & interleaving module, and a waveform generation module.

The input formatting module performs an input-format for the input packet to generate baseband packets for each PLP, and BICM module performs forward error correction (FEC), interleaving, and modulation for the baseband packets to generate cells (or data cells) for each PLP.

The framing and interleaving module performs time-interleaving for the cells of each PLP, and may map the time-interleaved cells to the frame on a frequency domain. Here, in some cases, the framing and interleaving module (not shown) may perform frequency-interleaving for cells mapped to orthogonal frequency division multiplexing (OFDM) symbols of the frame.

The waveform generation module may insert pilots into the frame, convert the OFDM symbols of the frame into a time domain through Inverse Fast Fourier Transform (IFFT), perform a reduction of peak to average power ratio (PAPR) using a reserve tone, and insert a guard interval into the frame to thereby transmit the broadcast signals to a receiver (not shown).

The above-mentioned processes schematically describe a method for processing the broadcast service defined in the ATSC 3.0 standard and a signaling therefor, and the transmitter 100 according to an exemplary embodiment of the present disclosure may process the broadcast data and signaling according to the method defined in the ATSC 3.0 standard.

Meanwhile, according to the ATSC 3.0 standard, as illustrated in FIG. 1, the frame includes a bootstrap 10, a preamble 20, and one or more subframes 30-1, . . . , 30-n.

In this case, the bootstrap 10 is positioned at a start of the frame, the preamble 20 is positioned after the bootstrap 10, and the one or more subframes 30-1, . . . , 30-n are positioned after the preamble 20.

The bootstrap 10, the preamble 20, and the one or more subframes 30-1, . . . , 30-n include one or more OFDM symbols, and the number of subcarriers (or carriers) of each OFDM symbol may be determined depending on an FFT mode (i.e., representing an FFT size, which may include 8K, 16K, and 32K).

In this case, the subcarriers used to transmit the broadcast data, the signaling, the pilot, and the like in the OFDM symbols are referred to as useful carriers, and even in the same FFT size, the number of useful carriers (NoC) may be different from each other. In this case, even in the same FFT size, as a value of NoC is large, relatively more frequencies may be used as the subcarriers.

For example, in 8K FFT, the NoC may be 6913, 6817, 6721, 6625, and 6529, in 16K FFT, the NoC may be 13825, 13633, 13441, 13249, and 13057, and even in 32K FFT, the NoC may be 27649, 27265, 26881, 26497, and 26113.

In this case, the transmit 100 may select the NoC depending on a channel environment or the like and configure the frame.

Meanwhile, the sub-subframes 30-1, . . . , 30-n may include subframe boundary symbols positioned at boundaries with other subframes, and data symbols positioned between the subframe boundary symbols. However, this is merely one example, and the subframes may include only data symbols. In addition, a first symbol or a last symbol in the subframe may correspond to the subframe boundary symbol, and the remaining symbols may also be configured as the data symbol.

In this case, the broadcast data may be mapped to the subframes 30-1, . . . , 30-n and transmitted to the receiver.

Here, the broadcast data may include audio data for at least one contents and additional data for second image data having image quality higher than first image data based the first image data.

In addition, the broadcast data may also include the audio data for at least one contents, the first image data, and the second image data. That is, the broadcast data may also include the second image data itself, rather than the additional data.

Here, the first image data may be high definition (HD) image data and the second image data may be ultra high definition (UHD) image data. In addition, the addition data may be a difference value between the HD image data and the UHD image data. In addition, the audio data may be an audio for the HD image data and the UHD image data.

Meanwhile, according to the ATSC 3.0 standard, pilots are inserted into the preamble and the subframes for channel estimation and synchronization.

Types of pilots inserted into the preamble and the subframes are as illustrated in Table 1 below.

TABLE 1

| Symbol Type | Preamble Pilot | Scattered Pilot | Subframe Boundary Pilot | Continual Pilot | Edge Pilot |
|---|---|---|---|---|---|
| Preamble | V | | | V | |
| Data | | V | | V | V |
| Subframe Boundary | | | V | V | V |

Referring to Table 1, a preamble pilot is inserted into the preamble, a scattered pilot (SP) is inserted into the data symbol, and a subframe boundary pilot is inserted into the subframe boundary symbol. In addition, a continual pilot (CP) is inserted into the preamble, the data symbol, and the subframe boundary symbol, and an edge pilot is inserted into the data symbol and the subframe boundary symbol.

Meanwhile, a position at which the pilot is inserted may be determined as indices itself of the subcarriers into which the pilot is inserted, or may be determined based on specific pilot patterns (e.g., Dx and Dy).

Here, Dx refers to a difference of carrier indices between adjacent carriers into which the pilot is inserted, in a frequency direction (this is defined as Separation of pilot bearing carriers (that is, in the frequency direction) in ATSC 3.0). That is, Dx is a value indicating an interval between the pilots on a frequency axis. Therefore, the smaller the value of Dx, the more pilot may be inserted into the OFDM symbol.

In addition, Dy refers to a difference of the number of symbols between continual pilots on a specific carrier, a time direction (this is defined as Number of symbols forming one scattered pilot sequence (time direction) in ATSC 3.0).

For example, in the case of the scattered pilot, the position at which the scattered pilot is inserted may be determined based on Dx and Dy. Specifically, the scattered pilot may be inserted into a subcarrier having an index k in an l-th OFDM symbol satisfying Mathematics Expression 1 below.

$$k \bmod(D_X D_Y) = D_X (l \bmod D_Y) \quad \text{[Mathematics Expression 1]}$$

Here, Dx and Dy may be defined as illustrated in Table 2 below, and Spa_b means a pilot pattern, which a is Dx (a=Dx) and b is Dy (b=Dy).

TABLE 2

| Pilot Pattern | Dx | Dy |
|---|---|---|
| SP3_2 | 3 | 2 |
| SP3_4 | 3 | 4 |
| SP4_2 | 4 | 2 |
| SP4_4 | 4 | 4 |
| SP6_2 | 6 | 2 |
| SP6_4 | 6 | 4 |
| SP8_2 | 8 | 2 |
| SP8_4 | 8 | 4 |
| SP12_2 | 12 | 2 |
| SP12_4 | 12 | 4 |
| SP16_2 | 16 | 2 |
| SP16_4 | 16 | 4 |
| SP24_2 | 24 | 2 |
| SP24_4 | 24 | 4 |
| SP32_2 | 32 | 2 |
| SP32_4 | 32 | 4 |

Meanwhile, the transmitter 100 may configure the frame by selecting Spa_b depending on a channel environment.

Meanwhile, in the ATSC 3.0 standard, the contents, the FFT size, NoC, and the pilot pattern (i.e., Dx, Dy) may be applied to each of the sub-frames. That is, the transmitter 100 may map the same or different contents to each of the sub-frames. In addition, the transmitter 100 may determine the FFT size, NoC, and the pilot pattern applied to each of the sub-frames, and generate each sub-frame using the determined FFT size, NoC, and pilot pattern. Accordingly, the sub-frame may have different contents, FFT sizes, NoC, and pilot patterns, for each of the sub-frames.

Here, according to diverse exemplary embodiments of the present disclosure, the transmitter 100 may determine a method for aligning the sub-frames within the frame based on the contents, the FFT size, the NoC, and the pilot pattern of the sub-frames, and this will be described below in more detail.

Figure 2:
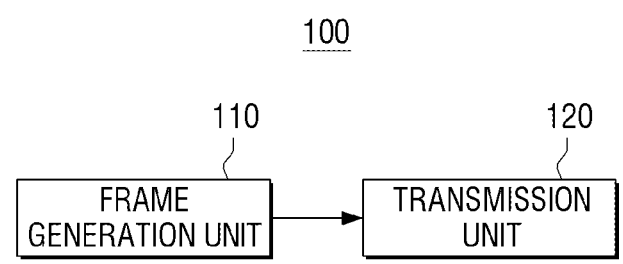
FIG. 2 is a block diagram illustrating a configuration of a transmitter according to an exemplary embodiment of the present disclosure.

FIG. 2 is a block diagram illustrating a configuration of a transmitter according to an exemplary embodiment of the present disclosure.

Referring to FIG. 2, the transmitter 100 includes a frame generation unit 110 and a transmission unit 120.

In this case, the transmitter 100 illustrated in FIG. 2 may process a broadcast service according to the ATSC 3.0 standard and transmit it to a receiver. Meanwhile, since the schematic method for processing the broadcast service in the ATSC 3.0 standard is described above, a detailed description thereof will be omitted.

The frame generation unit 110 generates a frame including a plurality of sub-frames including data and pilots, respectively.

Here, the data may include the broadcast data and the pilot may include the scattered pilot.

The transmission unit 120 transmits the frame to the receiver. To this end, the transmission unit 120 may include at least one transmission antenna to convert the frame into a radio signal and transmit it. As well, the transmission unit 120 may convert the frame into signals which may be transmitted through a wired or optical cable, and may also transmit it to the receiver.

Meanwhile, hereinafter, the order in which the plurality of subframes are arranged in the frame will be described below in more detail.

The frame generation unit 110 may determine an arrangement order of the plurality of subframes based on the FFT size, the NoC, and the pilot pattern, and may generate the frame including the plurality of subframes based on the determined arrangement order.

In this case, the frame generation unit 110 may generate the plurality of subframes arranged in a time axis according to the determined arrangement order, or may generate the frame by re-arranging the plurality of generated subframes according to the determined arrangement order.

First, the frame generation unit 110 may determine the arrangement order of the subframes based on the FFT size, and may arrange the plurality of subframes according to the determined arrangement order.

Specifically, the frame generation unit 110 may arrange the plurality of subframes in order from a subframe having a small FFT size to a subframe having a large FFT size, on the time axis.

Figure 3:
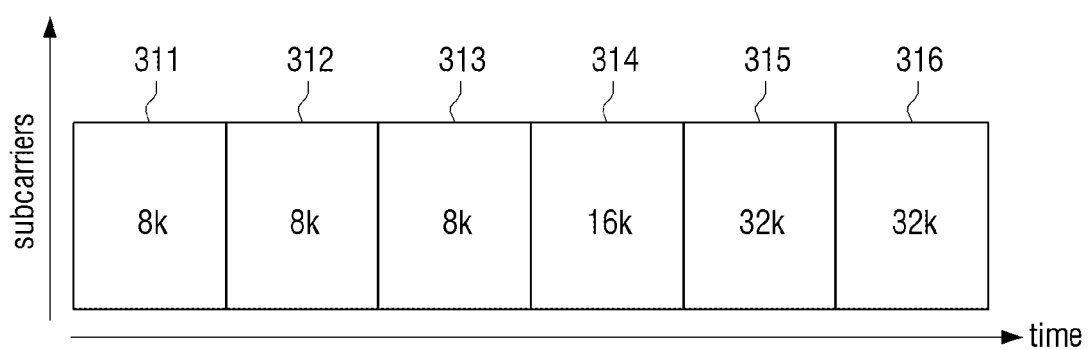
FIGS. 3 to 9 are diagrams illustrating a method for arranging a plurality of subframes in a frame according to diverse exemplary embodiments of the present disclosure.

For example, as illustrated in FIG. 3, the frame generation unit 110 may arrange subframes 311, 312, and 313 having the FFT size of 8K, arrange a subframe 314 having the FFT size of 16K followed by the subframes 311, 312, and 313 having the FFT size of 8K, and arrange subframes 315 and 316 having the FFT size of 32K followed by the subframe 314 having the FFT size of 16K.

In this case, if the FFT sizes of the plurality of subframes are the same as each other, the frame generation unit 110 may determine the arrangement order of the plurality of subframes based on the number of subcarriers used to transmit the data and the pilot, and arrange the plurality of subframes according to the determined arrangement order.

Here, the number of subcarriers used to transmit the data and the pilot indicates the NoC.

Specifically, the frame generation unit 110 may arrange the plurality of subframes in order from a subframe having a large number of subcarriers to a subframe having a small number of subcarriers, on the time axis.

For example, it is assumed that the NoCs of three subframes A, B, and C having the FFT size of 8K are 6529, 6721, and 6913, respectively.

Figure 4:
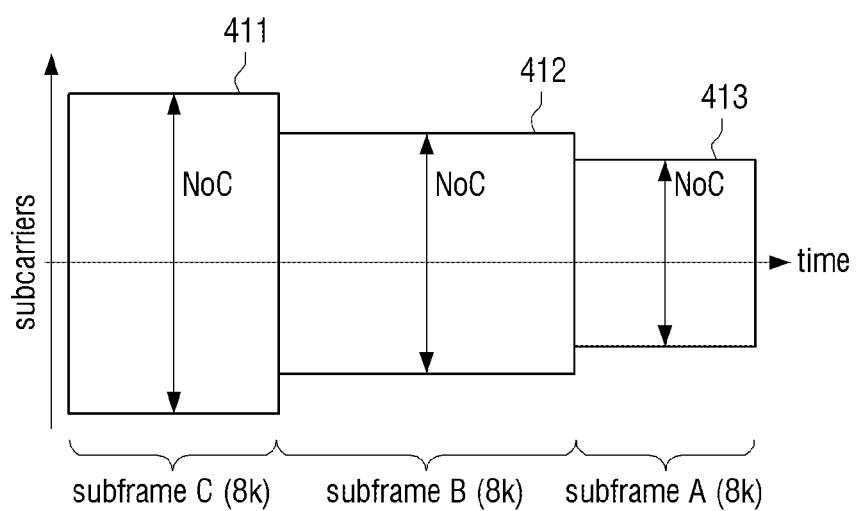

In this case, the frame generation unit 110 may arrange the subframes A, B, and C in order from a subframe having a large value of NoC to a subframe having a small value of NoC. That is, as illustrated in FIG. 4, the frame generation unit 110 may arrange the subframes in order of a subframe C 411 having 6913 subcarriers, a subframe B 412 having 6712 subcarriers, and a subframe A 413 having 6529 subcarriers.

As described above, the arrangement of the subframes from the subframe having the large NoC to the subframe having the small NoC is to more accurately perform channel estimation in the receiver.

Specifically, the pilot is inserted into the subframe for channel estimation. In this case, when a channel is estimated using the pilot of the subframe (i.e., a current subframe), if channel information estimated through the pilot of the subframe (i.e., a previous subframe) before the current subframe is used, more accurate channel estimation may be performed. When the channel is estimated in the current subframe, if the channel information estimated through the pilot of the previous subframe and the channel information estimated through the pilot of the current subframe are linear combined, it is possible to more accurately estimate the channel.

However, when the channel is estimated in the current subframe, if the channel information of the previous subframe is not used, performance deterioration may relatively occur.

Figure 5:
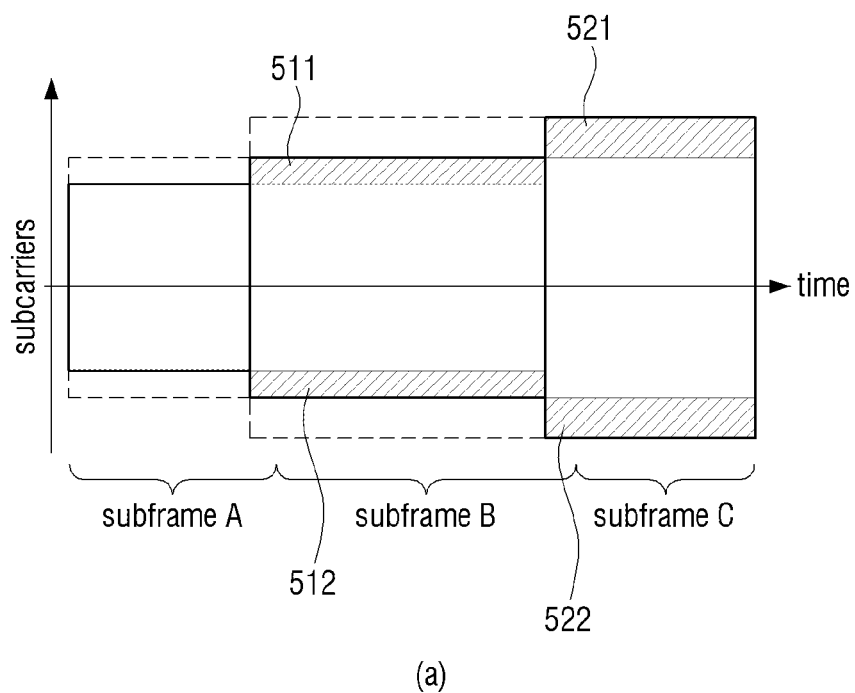
Figure 5:
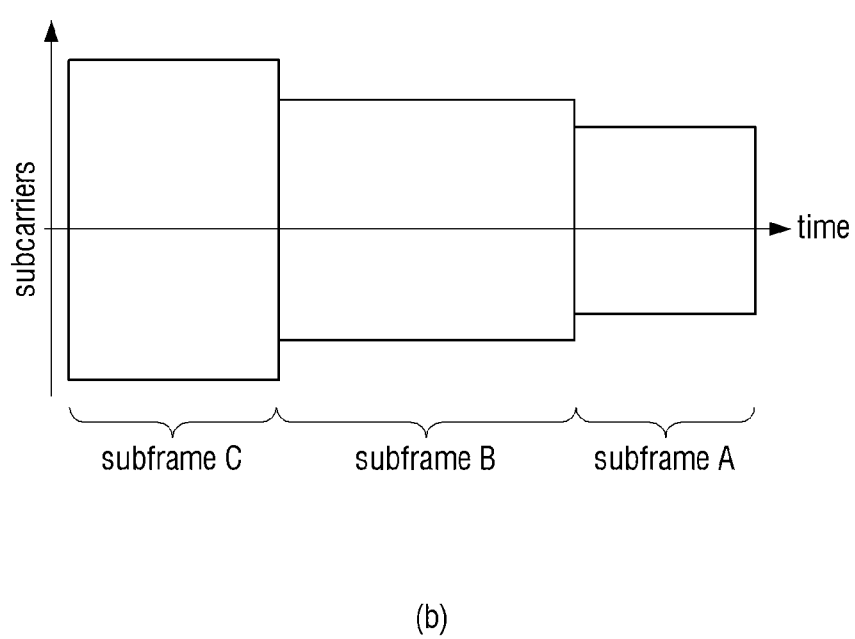

For example, it is assumed that the subframes are arranged in order of a subframe having a small value of NoC to a subframe having a large value of NoC. That is, as illustrated in FIG. 5A, it is assumed that the subframes A, B, and C are arranged in order of a subframe A having 6529 subcarriers, a subframe B having 6721 subcarriers, and a subframe C having 6913 subcarriers.

In this case, the receiver may sequentially receive the subframe A, the subframe B, and the subframe C, and may estimate the channel using the pilot inserted into each subframe in order of the subframe A, the subframe B, and the subframe C.

In this case, when the receiver estimates the channel using the pilots inserted into edge portions 511 and 512 of the subframe B, since a subcarrier having a frequency of the edge portions of the subframe b does not exist in the subframe A, channel information estimated in the subframe A may not be used in the edge portions of the subframe B.

In addition, when the receiver estimates the channel using the pilots inserted into edge portions 521 and 522 of the subframe C, since a subcarrier having a frequency of the edge portions of the subframe C does not exist in the subframe B, channel information estimated in the subframe B may not be used in the edge portions of the subframe C.

On the contrary, it is assumed that the subframes are arranged in order of a subframe having a large value of NoC to a subframe having a small value of NoC. That is, as illustrated in FIG. 5B, it is assumed that the subframes A, B, and C are arranged in order of a subframe C having 6913 subcarriers, a subframe B having 6721 subcarriers, and a subframe A having 6529 subcarriers.

In this case, the subframes C and B have a larger value of NoC than that of the subframes B and A arranged after the subframes B and A. Therefore, when the channel is estimated using the pilots inserted into the subframes C and B, the receiver may use the channel information estimated through the pilots inserted into the previous subframe, and as a result, the channel may be more accurately estimated.

Figure 6:
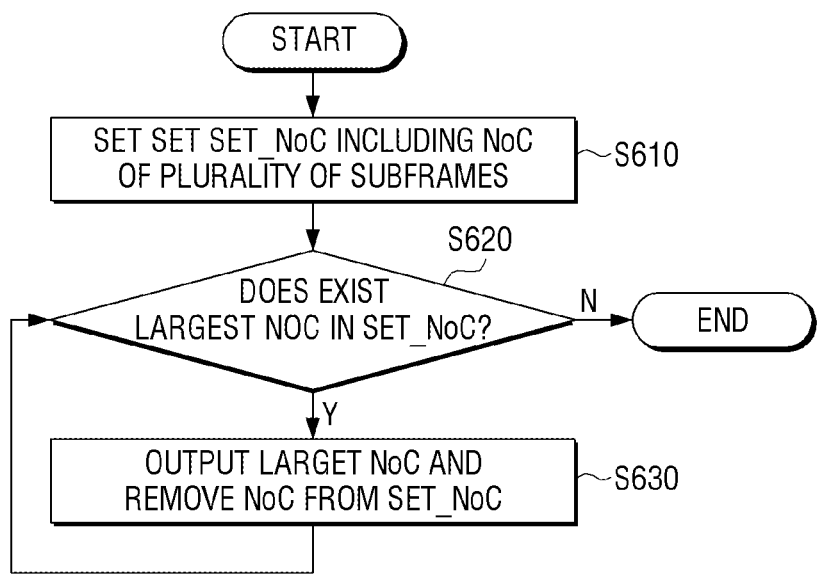

Meanwhile, FIG. 6 is a flowchart illustrating a method for arranging a plurality of subframes based on a value of NoC by a transmitter according to an exemplary embodiment of the present disclosure.

First, a set of values of NoC of a plurality of subframes is set to Set_NoC (S610).

In addition, it is determined whether the largest value of NoC exists in Set_NoC (S620).

In this case, if the largest value of NoC exists in Set_NoC (S620-Y), the largest value of NoC is output and the corresponding value of NoC is removed from Set_NoC (S630).

In this case, a subframe having the output value of NoC may be selected, and the selected subframe may be first arranged. In this case, a plurality of subframes have the largest value of NoC, the plurality of subframes may be arranged to be adjacent to each other.

Next, back to the operation S620, it is determined whether the largest value of NoC exists in Set_NoC.

In this case, if the largest value of NoC exists in Set_NoC (S620-Y), the largest value of NoC is output and the corresponding value of NoC is removed from Set_NoC (S630).

In this case, a subframe having the output value of NoC may be selected, and the selected subframe may be arranged after the previously selected subframe.

Next, back to the operation (S620), the above-mentioned operation is repeated until the largest value of NoC does not exist in Set_NoC, that is, an element of Set_NoC does not exist, and if the largest value of NoC does not exist in Set_NoC (S620-N), an algorithm ends.

Meanwhile, the example described above has described that when the plurality of subframes are arranged in order from the subframe having the small size of FFT size to the subframe having the large size of FFT size, the plurality of subframes having the same FFT size are arranged in order from the subframe having the large value of NoC to the subframe having the small value of NoC.

However, this is merely an example, and the frame generation unit 110 may also arrange the plurality of subframes having the same FFT size in order from the subframe having the large value of NoC to the subframe having the small value of NoC, even in a case in which the plurality of subframes are not arranged in order from the subframe having the small size of FFT size to the subframe having the large size of FFT size based on the FFT size.

For example, the frame generation unit 110 may arrange six subframes in order of a first subframe having the FFT size of 8K, a second subframe having the FFT size of 32K, a third subframe having the FFT size of 16K, a fourth subframe having the FFT size of 8K, a fifth subframe having the FFT size of 32K, and a sixth subframe having the FFT size of 8K.

In this case, when values of NoC of the first subframe, the fourth subframe, and the sixth subframe having the FFT size of 8K are $NoC_1$, $NoC_4$, and $NoC_6$, respectively, $NoC_1 \geq NoC_4 \geq NoC_6$ may be satisfied.

Meanwhile, the frame generation unit 110 may determine an arrangement order of the plurality of subframes based on a value of Dx indicating an interval of the scattered pilot on the frequency axis, and may also arrange the plurality of subframes according to the determined arrangement order.

In this case, the frame generation unit 110 may determine the arrangement order of the plurality of subframes so that the subframes having a value of Dx of integer multiple are arranged to be adjacent to each other based on the values of Dx of the plurality of subframes.

As described above, the frame generation unit 110 may arrange the plurality of subframes in order from the subframe having the small FFT size to the large FFT size, and in this case, the subframes having the same FFT size are arranged to be adjacent to each other.

In this case, when the plurality of subframes having the same FFT size are arranged, the frame generation unit 110 may arrange the subframes having the same value of NoC to be adjacent to each other.

For example, it is assumed that the NoC of the first subframe having the FFT size of 8K is 6913, the NoC of the second subframe having the FFT size of 8K is 6913, the NoC of the third subframe having the FFT size of 8K is 6817, the NoC of the fourth subframe having the FFT size of 8K is 6721, and the NoC of the fifth subframe having the FFT size of 8K is 6817.

In this case, the frame generation unit 110 may arrange the first subframe and the second subframe having the value of Dx of 6913 to be adjacent to each other, and may arrange the third subframe and the fifth subframe having the value of Dx of 6817 to be adjacent to each other.

As described above, when the frame generation unit 110 arranges the subframes having the same value of NoC to be adjacent to each other, the frame generation unit 110 may arrange the subframes having the value of Dx of integer multiple to be adjacent to each other.

Specifically, the frame generation unit 110 may arrange the first subframe having the smallest value of Dx among the plurality of subframe, and may arrange the second subframe having a value of Dx of integer multiple of the value of Dx of the first subframe after the first subframe. Here, the second subframe may be the subframe having the smallest value of Dx among one or more subframes having the value of Dx of integer multiple of the value of Dx of the first subframe.

In addition, the frame generation unit 110 may arrange a third subframe having a value of Dx of integer multiple of the value of Dx of the second subframe among the plurality of subframes after the second subframe. Here, the third subframe may be the subframe having the smallest value of Dx among one or more subframes having the value of Dx of integer multiple of the value of Dx of the second subframe.

In addition, the frame generation unit 110 may arrange the first subframe having the smallest value of Dx among the plurality of subframes and at least one subframe having the value of Dx of integer multiple of the value of Dx of the first subframe to be adjacent to each other by repeating the operations described above.

In addition, the frame generation unit 110 may arrange a fourth subframe having the smallest value of Dx among the values of Dx which is not integer multiple of the value of Dx of the first subframe, after the second subframe.

That is, the frame generation unit 110 may arrange the subframe having the smallest value of Dx among the values of Dx which is not integer multiple of the smallest value of Dx among the values of Dx of the plurality of subframes after the last arranged subframe among one or more subframes having an integer multiple of the smallest value of Dx.

Meanwhile, when the subframe having the value of Dx of the integer multiple of the value of Dx of the first subframe does not exist in the plurality of subframes, the frame generation unit 110 may arrange a fifth subframe having a small value of Dx next to the value of Dx of the first subframe, after the first subframe.

In addition, the frame generation unit 110 may repeat the operations described above for the fifth subframe.

As a result, the frame generation unit 110 may arrange at least one subframe having the value of Dx of the integer multiple of the smallest value of Dx among the values of Dx of the plurality of subframes by repeating the operations described above, and may arrange at least one subframe having the value of Dx of the integer multiple of the smallest value of Dx among values of Dx which doe not correspond to the integer multiple of the smallest value of Dx, after the at least one corresponding subframe.

For example, it is assumed that values of Dx of subframes A to H having the same value of NoC are 3, 4, 6, 6, 8, 12, 24, and 24.

That is, it is assumed that the value of Dx of the subframe A is 3, the value of Dx of the subframe B is 4, the value of Dx of the subframe C is 6, the value of Dx of the subframe D is 6, the value of Dx of the subframe E is 8, the value of Dx of the subframe F is 12, the value of Dx of the subframe G is 24, and the value of Dx of the subframe H is 24.

Figure 7:
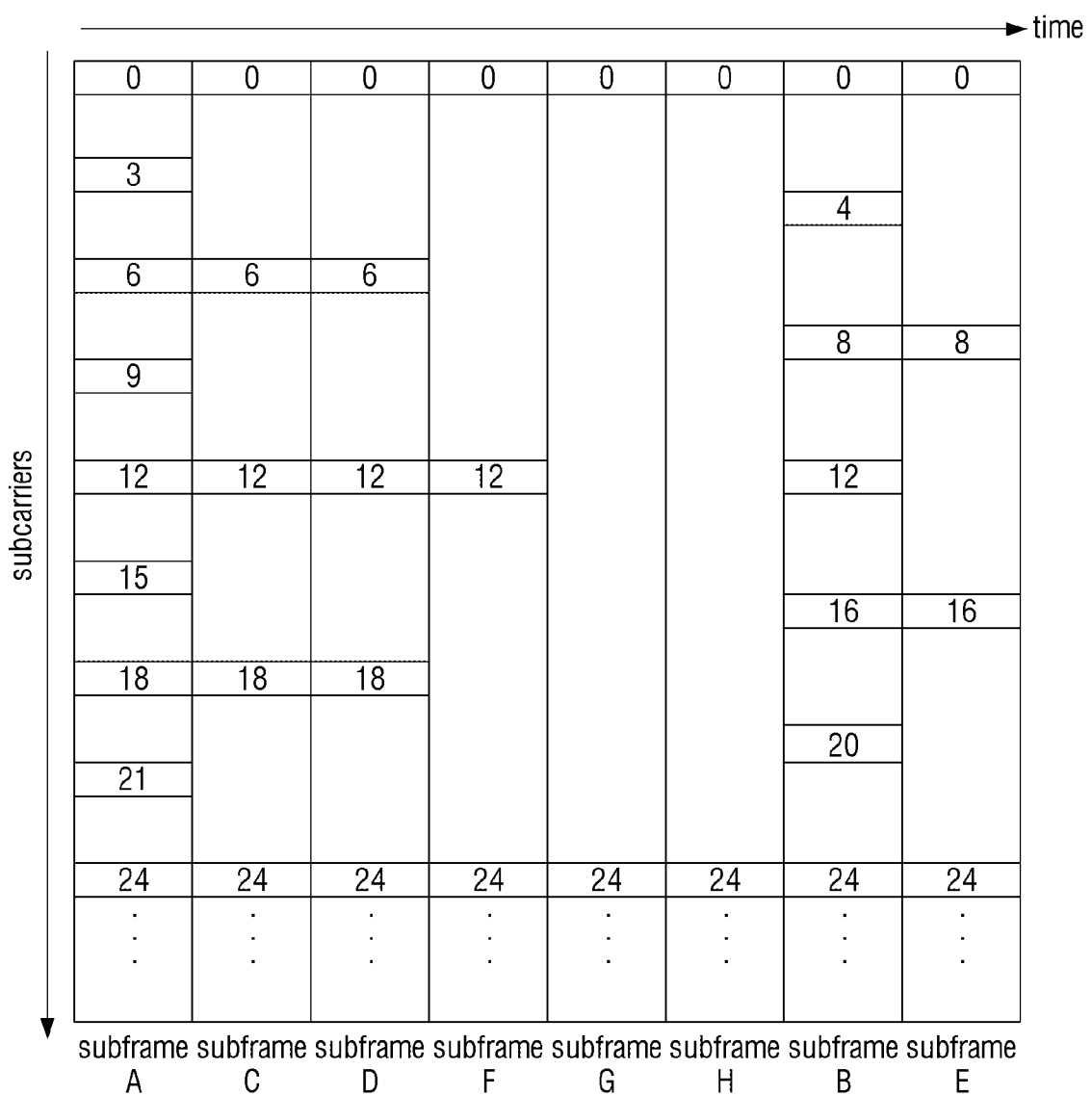

In this case, as illustrated in FIG. 7, the frame generation unit 110 may first arrange the subframe A having the smallest value of Dx among the eight subframes on the time axis.

In addition, among the remaining subframes, the subframes corresponding to the integer multiple of the value of Dx (Dx=3) of the subframe A are the subframe C (Dx=6), the subframe D (Dx=6), the subframe F (Dx=12), the subframe G (Dx=24), and the subframe H (Dx=24).

Therefore, the frame generation unit 110 may arrange the subframe C and the subframe D having the smallest value of Dx among these subframes after the subframe A on the time axis.

In addition, among the remaining subframes, the subframes having the value of Dx corresponding to the integer multiple of the value of Dx (Dx=6) of the subframe C and the subframe D are the subframe F (Dx=12), the subframe G (Dx=24), and the subframe H (Dx=24).

Therefore, the frame generation unit 110 may arrange the subframe F having the smallest value of Dx among these subframes after the subframe D on the time axis.

In addition, since the value of Dx of the subframe G and the subframe H, which are the remaining subframes, is the integer multiple of the value of Dx of the subframe F, the frame generation unit 110 may arrange the subframe G and the subframe H after the subframe F on the time axis.

Meanwhile, the values of Dx (Dx=4,8) of the subframe B and the subframe E, which are the remaining subframes, do not correspond to the integer multiple of the value of Dx (Dx=24) of the subframe G and the subframe H.

Therefore, the frame generation unit 110 may arrange the subframe B having the smallest value of Dx among the remaining subframes after the subframe H on the time axis.

In addition, since the value of Dx (Dx=8) of the subframe E, which is the remaining subframe, is an integer multiple of the value of Dx (Dx=4) of the subframe B, the frame generation unit 110 may arrange the subframe E after the subframe B on the time axis.

Meanwhile, in FIG. 7, the numbers shown in each subframe indicate indexes of subcarriers into which the pilot (e.g., the scattered pilot) is inserted in each subframe. For example, in FIG. 7, in the case of the subframe A, since the value of Dx is 3, it may be appreciated that the pilot is inserted into the subcarriers having indexes of 3,6,9,12,15, 18,21,24 . . . .

As described above, arranging the subframes having the value of Dx of the integer multiple to be adjacent to each other is to more accurately perform channel estimation in the receiver.

Specifically, in the case in which the subframes having the value of Dx of an integer multiple are arranged to be adjacent to each other, the subcarriers into which the pilot is inserted may be continuously arranged between the subframes which are adjacent to each other. Accordingly, when the channel is estimated in the current subframe, since the channel information estimated through the pilot of the previous subframe may be used, the channel may be more accurately estimated.

Figure 8:
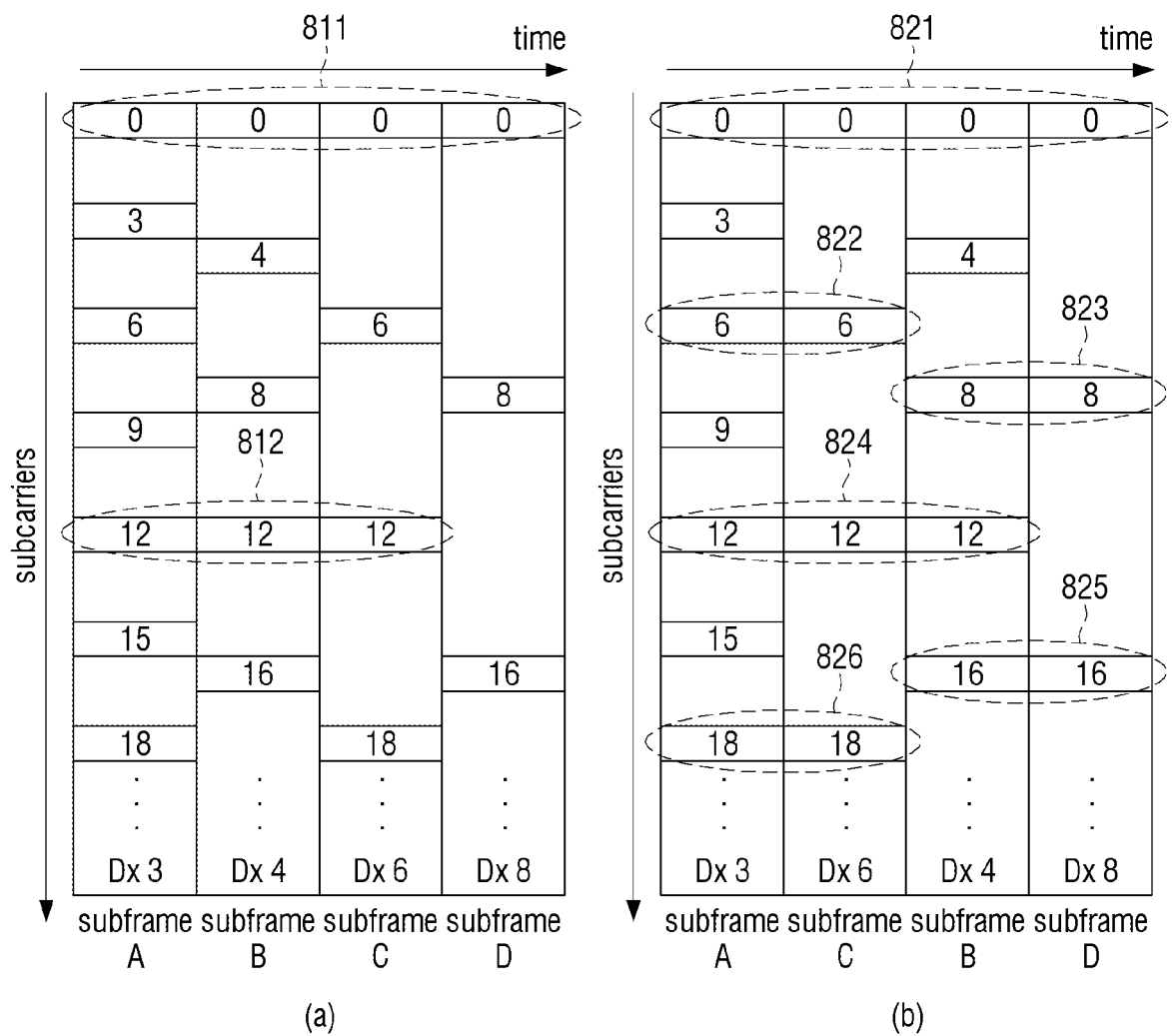

For example, it is assumed that the plurality of subframes are arranged in order from a subframe having a small value of Dx to a subframe having a large value of Dx. That is, as illustrated in FIG. 8A, it is assumed that subframes A, B, C, and D are arranged in order of the subframe A having Dx of 3, the subframe B having Dx of 4, the subframe C having Dx of 6, and the subframe D having Dx of 8.

In this case, the pilot is continuously arranged in the subcarriers having the indexes of the subcarrier of 0 (811) and 12(812), between the subframes which are adjacent to each other.

On the contrary, it is assumed that the subframes having the value of Dx of the integer multiple are arranged to be adjacent to each other. That is, as illustrated in FIG. 8B, it is assumed that subframes A, B, C, and D are arranged in order of the subframe A having Dx of 3, the subframe C having Dx of 6, the subframe B having Dx of 4, and the subframe D having Dx of 8.

In this case, the pilot is continuously arranged in the subcarriers having the indexes of the subcarrier of 0(821), 6(822), 8(823), 12(824), 16(825), and 18(826), between the subframes which are adjacent to each other.

As described above, as compared to the case in which the plurality of subframes are arranged in order of the subframe having the small value of Dx to the subframe having the large value of Dx, in a case in which the plurality of subframes are arranged in order of the subframe having the small value of Dx to the subframe having the large value of Dx and the subframes having the value of Dx of the integer multiple are arranged to be adjacent to each other, the number of the pilots which are continuously arranged between the subframes which are adjacent to each other is further increased, and as a result, the channel may be more accurately estimated.

Figure 9:
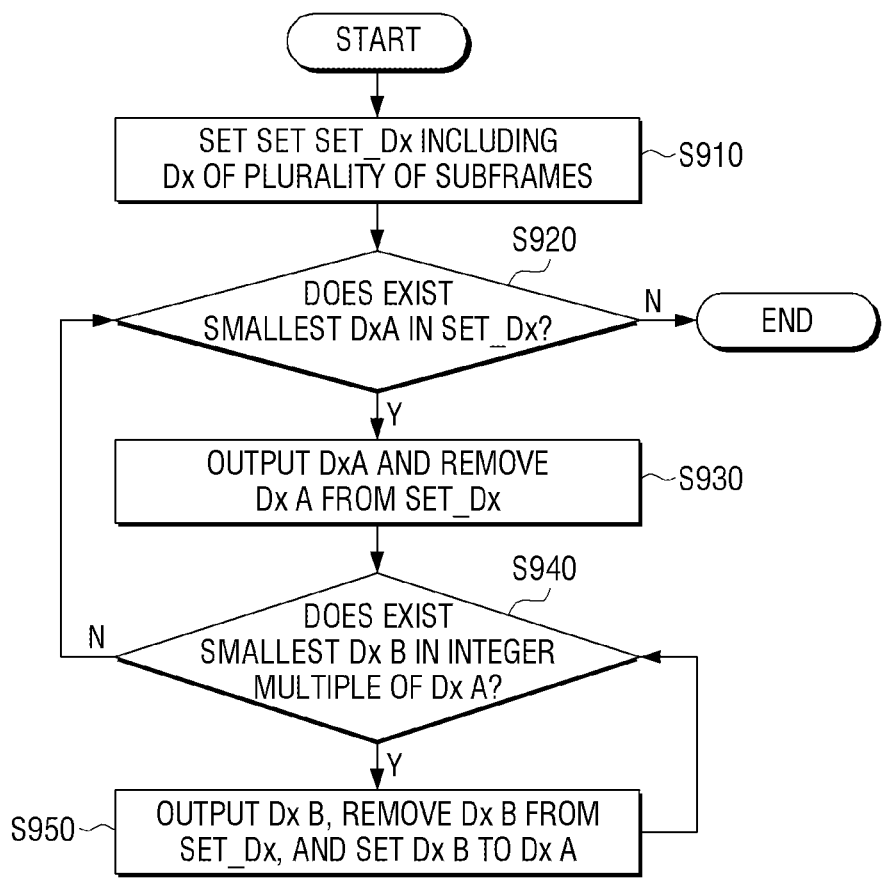

Meanwhile, FIG. 9 is a flowchart illustrating a method for arranging a plurality of subframes based on a value of Dx by a transmitter according to an exemplary embodiment of the present disclosure.

First, a set of values of Dx of a plurality of subframes is set to Set_Dx (S910).

In addition, it is determined whether DxA corresponding to the smallest value of Dx exists in Set_Dx (S920).

Here, if a value of DxA exists in Set_Dx (S920-Y), the value of DxA is output and the value of DxA is removed from Set_Dx (S930).

In this case, a subframe having the output value of DxA may be selected, and the selected subframe may be first arranged. In this case, a plurality of subframes have the value of DxA, the plurality of subframes may be arranged to be adjacent to each other.

Next, it is determined whether DxB corresponding to the smallest value of Dx among the values of Dx corresponding to the integer multiple of the value of DxA exists (S940).

Here, if a value of DxB exists in Set_Dx (S940-Y), the value of DxB is output, the value of DxB is removed from Set_Dx, and the value of DxB is set to DxA (S950).

In this case, a subframe having the output value of DxB may be selected, and the selected subframe may be arranged after the previously selected subframe.

Next, back to the operation (S940), the operations described above are repeated until DxB, which is the smallest value of Dx among the values of Dx corresponding to the integer multiple of the value of DxA does not exist.

Accordingly, the subframes having the values of Dx corresponding to the integer multiple of the value of DxA may be arranged to be adjacent to each other.

Meanwhile, if DxB, which is the smallest value of Dx among the values of Dx corresponding to the integer multiple of the value of DxA, does not exist (S940-N), that is, the values corresponding to the integer multiple of the value of DxA do not exist in Set_Dx, return to the operation (S920) and the operations described above may be repeated. In this case, the operations described above may be repeated until the value of DxA does not exist in Set_Dx, and if the value of DxA does not exist in Set_Dx (S920-N), an algorithm ends.

Meanwhile, as described above, the plurality of subframes may be arranged in the frame in order from a subframe having a small FFT size to a subframe having a large FFT size.

As described above, if the plurality of subframes are arranged based on the FFT size, the receiver may more efficiently process the subframes having FFT size which may be processed in consideration of own reception performance.

For example, the receiver capable of receiving the broadcast service may be classified into a wearable deice (e.g., a smart watch), a mobile device (e.g., a smartphone), and a stationary device (e.g., a TV) depending on the type thereof.

In this case, hardware performance of processing signals in each device may have a difference depending on the size and manufacturing cost of each device. For example, a mobile device rather than a wearable device, and a fixed device rather than the mobile device may have hardware having relatively better performance.

In this case, the wearable device may be configured to process the subframe having the FFT size of 8K which is the lowest complexity, the mobile device may be configured to process the subframes having the FFT sizes of 8K and 16K, and the fixed device may be configured to process the subframes having the FFT sizes of 8K and 16K, and the subframe having the FFT size of 32K, which is the highest complexity.

Accordingly, in a case in which the transmitter 100 generate the frame in which the plurality of subframes are arranged in order from the subframe having the small FFT size to the subframe having the large FFT size and transmits it to the receiver, the receiver may more easily select the subframe which may be processed by the receiver depending on the FFT size and process the selected subframe.

In this case, the frame generation unit 110 may map different data for the contents to each of the subframes based on the FFT size.

In this case, the frame generation unit 110 may map audio data for the contents to at least one subframe (e.g., a first FFT group) having a first FFT size, map first image data for the contents to at least one subframe (e.g., a second FFT group) having a second FFT size larger than the first FFT size, and map additional data to at least one subframe (e.g., a third FFT group) having a third FFT size larger than the second FFT size.

Here, the first FFT size may be 8K, the second FFT size may be 16K, and the third FFT size may be 32K.

In addition, the audio data include an audio for the contents and the first image data include HD image data for the contents. In addition, the additional data is data required to generate UHD image data based on the HD image data, and may be, for example, a difference value between the HD image data and the UHD image data.

In the case in which the plurality of subframes are configured according to the method as described above, the wearable device may decode the audio data from the subframe having the FFT size 8K and reproduce the audio data. In addition, the mobile device may decode the audio data and the HD image data from the subframes having the FFT sizes of 8K and 16K and reproduce the audio data and the HD image data. In addition, the fixed device may decode the audio data, the HD image data, and the difference value from the subframes having the FFT sizes of 8K, 16K, and 32K. In this case, the fixed device may generate the UHD image data by adding the difference value to the HD image data, and reproduce the audio data and the UHD image data.

As described above, according to an exemplary embodiment of the present disclosure, since the audio data and the image data for one contents are mapped to the subframes having different FFT sizes and are transmitted to the receiver, the receiver may process the data according to the processing performance thereof and reproduce the processed data.

Meanwhile, the example described above describes that the additional data is transmitted to the receiver to reproduce the UHD image data, but this is merely one example. That is, the frame generation unit 110 may map the UHD image data itself to the subframes instead of the additional data, and transmit it to the receiver. In this case, the UHD image data may be mapped to at least one subframe having the FFT size of 32K.

In addition, the example described above describes that the audio data and the image data for one contents are mapped to the subframes having the different FFT sizes, but this is merely one example. That is, the frame generation unit 110 may also map the audio data and the image data for different contents to the subframes having different FFT sizes, and in this case, the receiver may select only the required contents from the subframes having the FFT size which may be processed by the receiver, and decode the selected contents.

In addition, the example described above has described that the audio data, the image data, and the additional data are mapped to the subframes having the different FFT sizes. However, the frame generation unit 110 may also map at least two data among the audio data, the image data, and the additional data to the subframes having the same FFT size.

Figure 10:
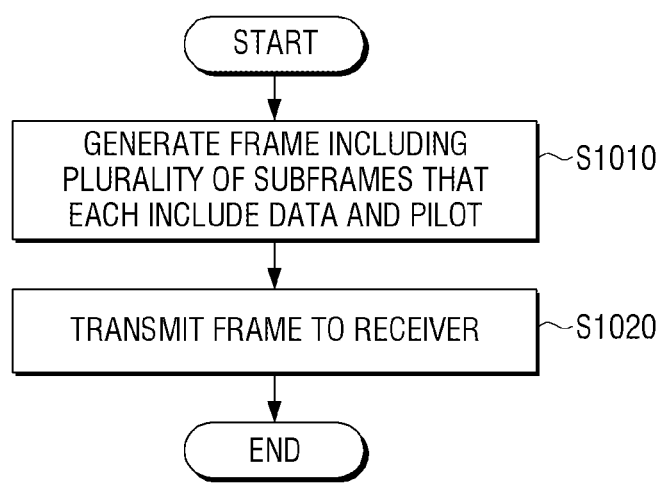
FIG. 10 is a flowchart illustrating a method for arranging subframes according to an exemplary embodiment of the present disclosure.

FIG. 10 is a flowchart illustrating a method for arranging subframes according to an exemplary embodiment of the present disclosure.

First, a frame including a plurality of subframes that each include data and a pilot, is generated (S1010).

In addition, the frame is transmitted to the receiver (S1020).

Meanwhile, in the operation (S1010), if the FFT sizes of the plurality of subframes are the same as each other, an arrangement order of the plurality of subframes may be determined based on the number of subcarriers used to transmit the data and the pilots, and the plurality of subframes may be arranged according to the determined arrangement order.

In this case, the plurality of subframes may be arranged in order from a subframe having the large number of subcarriers to a subframe having the small number of subcarriers.

In addition, in the operation (S1010), the arrangement order of the plurality of subframes may be determined based on a value of Dx indicating an interval of the scattered pilot on a frequency axis, and the plurality of subframes may be arranged according to the determined arrangement order.

In this case, in the operation (S1010), a first subframe having the smallest value of Dx among the plurality of subframe may be disposed, and a second subframe having a value of Dx of an integer multiple of the value of Dx of the first subframe may be arranged after the first subframe.

Here, the second subframe may be the subframe having the smallest value of Dx among one or more subframes having the value of Dx of integer multiple of the value of Dx of the first subframe.

In addition, in the operation (S1010), a third subframe having a value of Dx of an integer multiple of the value of Dx of the second subframe among the plurality of subframes may be arranged after the second subframe.

Here, the third subframe may be the subframe having the smallest value of Dx among one or more subframes having the value of Dx of an integer multiple of the value of Dx of the second subframe.

In addition, in the operation (S1010), a fourth subframe having the smallest value of Dx among the values of Dx which is not an integer multiple of the value of Dx of the first subframe may be arranged after the second subframe.

In addition, in operation (S1010), when the subframe having the value of Dx of the integer multiple of the value of Dx of the first subframe does not exist in the plurality of subframes, a fifth subframe having a small value of Dx next to the value of Dx of the first subframe may be arranged after the first subframe.

Meanwhile, in the operation (S1010), the plurality of subframes may be arranged in order from the subframe having the small FFT size to the subframe having the large FFT size, based on the FFT size of each of the plurality of subframes.

Here, the data may include audio data, first image data, and additional data for generating second image data having image quality higher than first image data based the first image data. In this case, the audio data may included in at least one subframe having a first FFT size, the first image data may be included in at least one subframe having a second FFT size larger than the first FFT size, and the additional data may be included in at least one subframe having a third FFT size larger than the second FFT size.

Meanwhile, a non-transitory computer readable medium having a program stored therein may be provided, wherein the program sequentially performs the method for arranging the subframes according to the present disclosure.

The non-transitory computer readable medium does not mean a medium that stores data for a short period such as a register, a cache, a memory, or the like, but means a machine readable medium that semi-permanently stores the data. Specifically, various applications or programs described above may be stored and provided in the non-transitory computer readable medium such as a compact disc (CD), a digital versatile disk (DVD), a hard disk, a Blu-ray disk, a universal serial bus (USB), a memory card, a read-only memory (ROM), or the like.

In addition, although the bus is not shown in the block diagram showing the transmitter, communications between the respective components in the transmitter may also be performed via the bus. In addition, the transmitter may further include a processor such as a central processing unit (CPU), a microprocessor, or the like that performs various operations described above, and may further include a memory for performing various operation described above.

In addition, the components, the modules, the units, and the like according to the exemplary embodiment of the present disclosure may be implemented in hardware, firmware or software for performing at least one function or operation, or may be implemented in a combination thereof. For example, they may have an integrated circuit structure such as a memory, a processing logic, a lookup table, and the like capable of executing each function through a control of at least one or more microprocessors or other controllers. In addition, they may also be implemented by a program or a code including at least one instruction which may be executed to perform a specific logic function. In addition, they may include a processor the CPU and the microprocessor for executing the respective functions. In addition, they may be integrated into at least one module or chip and may be implemented in at least one processor (not shown), except for a case in which they need to be each implemented in individual specific hardware.

Although exemplary embodiments have been illustrated and described hereinabove, the present disclosure is not limited to the above-mentioned specific exemplary embodiments, but may be variously modified by those skilled in the art to which the present disclosure pertains without departing from the scope and spirit of the present disclosure as disclosed in the accompanying claims. These modifications should also be understood to fall within the scope of the present disclosure.

The invention claimed is:

1. A transmitter comprising:
 a frame generation unit configured to generate a frame including a plurality of subframes that each include data and a pilot; and
 a transmission unit configured to transmit the frame to a receiver,
 wherein when FFT sizes of the plurality of subframes are the same as each other, the frame generation unit determines an arrangement order of the plurality of subframes based on the number of subcarriers used to transmit the data and the pilot, and arranges the plurality of subframes according to the determined arrangement order.

2. The transmitter as claimed in claim 1, wherein the frame generation unit arranges the plurality of subframes in order of a subframe having the large number of subcarriers to a subframe having the small number of subcarriers.

3. The transmitter as claimed in claim 1, wherein the frame generation unit determines the arrangement order of the plurality of subframes based on a value of Dx indicating an interval of scattered pilot on a frequency axis, and arranges the plurality of subframes according to the determined arrangement order.

4. The transmitter as claimed in claim 3, wherein the frame generation unit arranges a first subframe having the smallest value of Dx among the plurality of subframes, and arranges a second subframe having a value of Dx of an integer multiple of the value of Dx of the first subframe after the first subframe.

5. The transmitter as claimed in claim 4, wherein the second subframe is a subframe having the smallest value of Dx among one or more subframes having the value of Dx of the integer multiple of the value of Dx of the first subframe.

6. The transmitter as claimed in claim 4, wherein the frame generation unit arranges a third subframe having a value of Dx of an integer multiple of the value of Dx of the second subframe among the plurality of subframes after the second subframe.

7. The transmitter as claimed in claim 6, wherein the third subframe is a subframe having the smallest value of Dx among one or more subframes having the value of Dx of the integer multiple of the value of Dx of the second subframe.

8. The transmitter as claimed in claim 4, wherein the frame generation unit arranges a fourth subframe having the smallest value of Dx among values of Dx which is not an integer multiple of the value of Dx of the first subframe after the second subframe.

9. The transmitter as claimed in claim 4, wherein when the subframe having the value of Dx of the integer multiple of the value of Dx of the first subframe does not exist in the plurality of subframes, the frame generation unit arranges a fifth subframe having a small value of Dx next to the value of Dx of the first subframe after the first subframe.

10. The transmitter as claimed in claim 1, wherein the frame generation unit arranges the plurality of subframes in order of a subframe having a small FFT size to a subframe having a large FFT size based on a FFT size of each of the plurality of subframes,
the data includes audio data, a first image data, and additional data for generating second image data having image quality higher than that of first image data based on the first image data,
the audio data is included in at least one subframe having a first FFT size,
the first image data is included in at least one subframe having a second FFT size larger than the first FFT size, and
the additional data is included in at least one subframe having a third FFT size larger than the second FFT size.

11. A method for arranging subframes of a transmitter, the method comprising:
generating a frame including a plurality of subframes that each include data and a pilot; and
transmitting the frame to a receiver,
wherein in the generating of the frame, when FFT sizes of the plurality of subframes are the same as each other, an arrangement order of the plurality of subframes is determined based on the number of subcarriers used to transmit the data and the pilot, and the plurality of subframes are arranged according to the determined arrangement order.

12. The method as claimed in claim 11, wherein in the generating of the frame, the plurality of subframes are arranged in order of a subframe having the large number of subcarriers to a subframe having the small number of subcarriers.

13. The method as claimed in claim 11, wherein in the generating of the frame, the arrangement order of the plurality of subframes is determined based on a value of Dx indicating an interval of scattered pilot on a frequency axis, and the plurality of subframes are arranged according to the determined arrangement order.

14. The method as claimed in claim 13, wherein in the generating of the frame, a first subframe having the smallest value of Dx among the plurality of subframes is arranged, and a second subframe having a value of Dx of an integer multiple of the value of Dx of the first subframe is arranged after the first subframe.

15. The method as claimed in claim 14, wherein the second subframe is a subframe having the smallest value of Dx among one or more subframes having the value of Dx of the integer multiple of the value of Dx of the first subframe.

* * * * *